United States Patent
Takechi et al.

(10) Patent No.: US 11,291,195 B2
(45) Date of Patent: Apr. 5, 2022

(54) FISHING REEL

(71) Applicant: Shimano Inc., Osaka (JP)

(72) Inventors: Kunio Takechi, Osaka (JP); Youhei Toake, Osaka (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/144,634

(22) Filed: Jan. 8, 2021

(65) Prior Publication Data

US 2021/0212302 A1 Jul. 15, 2021

(30) Foreign Application Priority Data

Jan. 15, 2020 (JP) .............................. JP2020-004597

(51) Int. Cl.
| | |
|---|---|
| *A01K 89/01* | (2006.01) |
| *A01K 89/015* | (2006.01) |
| *A01K 89/033* | (2006.01) |
| *A01K 89/00* | (2006.01) |

(52) U.S. Cl.
CPC .......... *A01K 89/0193* (2015.05); *A01K 89/05* (2015.05); *A01K 89/006* (2013.01)

(58) Field of Classification Search
CPC ........ A01K 89/0193; A01K 89/011223; A01K 89/01931; A01K 89/058; A01K 89/059
See application file for complete search history.

(56) References Cited

U.S. PATENT DOCUMENTS

| | | | | | |
|---|---|---|---|---|---|
| 5,961,222 | A | * | 10/1999 | Yabe | ....................... F16C 19/52 |
| | | | | | 384/476 |
| 2018/0283455 | A1 | * | 10/2018 | Iizuka | ................. F16C 33/7853 |

FOREIGN PATENT DOCUMENTS

| CN | 85108036 B | * | 8/1988 | .......... F16C 33/7853 |
|---|---|---|---|---|
| EP | 1908972 B1 | * | 11/2011 | |
| JP | 2010070279 A | * | 4/2010 | |
| JP | WO2013018865 A1 | * | 3/2015 | ............ F16C 33/586 |
| JP | 2019065941 A | * | 4/2019 | |
| JP | 2019-097522 A | | 6/2019 | |
| JP | 2021148518 A | * | 9/2021 | |
| JP | 2021167647 A | * | 10/2021 | |
| WO | WO-2015043630 A1 | * | 4/2015 | .............. F16C 43/04 |
| WO | WO-2015043631 A1 | * | 4/2015 | ............ F16C 25/083 |
| WO | WO-2019114853 A1 | * | 6/2019 | .......... F16C 33/7879 |

* cited by examiner

*Primary Examiner* — Emmanuel M Marcelo
(74) *Attorney, Agent, or Firm* — United IP Counselors, LLC

(57) ABSTRACT

A dual-bearing reel includes a reel body, a spool shaft, a rolling bearing, and an elastic element. The spool shaft is rotatable with respect to the reel body. The rolling bearing has an outer diameter of 8 mm or less and supports the spool shaft. The rolling bearing includes an outer ring having a holding groove in an outer peripheral surface thereof, an inner ring connected to the spool shaft so as to be integrally rotatable, and a rolling element disposed between the outer ring and the inner ring. The elastic element has an annular shape and is held in the holding groove. The holding groove is located in a position that does not overlap with the rolling element in a radial direction of the spool shaft. The outer ring has a minimum thickness that is 10% or more of the outer diameter of the rolling bearing.

11 Claims, 3 Drawing Sheets

FISHING REEL

CROSS-REFERENCE TO RELATED APPLICATIONS

This application claims priority to Japanese Patent Application No. 2020-004597, filed Jan. 15, 2020. The contents of that application are incorporated by reference herein in their entirety.

TECHNICAL FIELD

The present invention relates to a fishing reel.

BACKGROUND ART

In a fishing reel, a rotating shaft such as a spool shaft is rotatably supported on a reel body via a rolling bearing. In Japanese Patent Application Publication No. 2001-95438, in order to absorb the vibration caused by the rotation of the rotating shaft, an annular elastic element is disposed between the outer peripheral surface of the rolling bearing and the inner peripheral surface of a mounting hole where the rolling bearing is mounted. The elastic element is held by a groove formed in the inner peripheral surface of the mounting hole.

In a case of holding the elastic element with the groove formed in the inner peripheral surface of the mounting hole, it is difficult to accurately process and control the inner diameter of the groove. In addition, the vibration cannot be absorbed efficiently, and the press-fitting pressure of the bearing during assembly cannot be stabilized easily.

Japanese Patent Application Publication No. 2019-97522 discloses a configuration in which the groove for holding the elastic element is formed in the outer peripheral surface of the rolling bearing.

BRIEF SUMMARY

In order to support a high-speed rotating shaft such as a spool shaft using a rolling bearing, it is desirable to use a rolling bearing with a small frictional resistance to the rotation, that is, a rolling bearing having a small outer diameter as long as the load bearing capacity allows. However, with a rolling bearing having an outer diameter of, for example, 8 mm or less, it is difficult to form the groove for holding the elastic element because the outer ring is thin. Consequently, the diameter of a rolling element disposed between the outer ring and the inner ring of the rolling bearing could be reduced, but in so doing, the load bearing capacity is significantly deteriorated.

An object of the present invention is to provide a fishing reel configured to reduce the vibration caused by the rotation of a rotating shaft supported by a rolling bearing while reducing a decrease in load bearing capacity of the rolling bearing.

A fishing reel according to one aspect of the present invention includes a reel body, a shaft member, a rolling bearing, and an elastic element. The shaft member is rotatable with respect to the reel body. The rolling bearing has an outer diameter of 8 mm or less and supports the shaft member. The rolling bearing includes an outer ring having a holding groove on an outer peripheral surface thereof, an inner ring connected to the shaft member so as to be integrally rotatable, and a rolling element disposed between the outer ring and the inner ring. The elastic element has an annular shape and is held in the holding groove. The holding groove is located in a position that does not overlap with the rolling element in a radial direction of the shaft member. The outer ring has a minimum thickness that is 10% or more of the outer diameter of the rolling bearing.

In this fishing reel, since the minimum thickness of the outer ring is 10% or more of the outer diameter of the rolling bearing, the thickness of the outer ring can be secured to form the holding groove while reducing a decrease in load bearing capacity of the rolling bearing. With this configuration, the elastic element is able to absorb the vibration caused by the rotation of the rotating shaft, thereby reducing the vibration caused by the rotation of the rotating shaft. Further, since the outer diameter of the rolling bearing is 8 mm or less, the frictional resistance thereof to the rotation of the rotating shaft is also kept small.

The minimum thickness of the outer ring can be 20% or less of the outer diameter of the rolling bearing. In this case, a decrease in load bearing capacity of the rolling bearing can be reduced more effectively.

The minimum thickness of the outer ring can be 70% or more of the diameter of the rolling element. In this case, a decrease in load bearing capacity of the rolling bearing can be reduced more efficiently.

According to the present invention, the fishing reel has a configuration in which the vibration caused by the rotation of the rotating shaft supported by the rolling bearing can be reduced and the deterioration in load bearing capacity of the rolling bearing also can be reduced.

DETAILED DESCRIPTION

Figure 1:
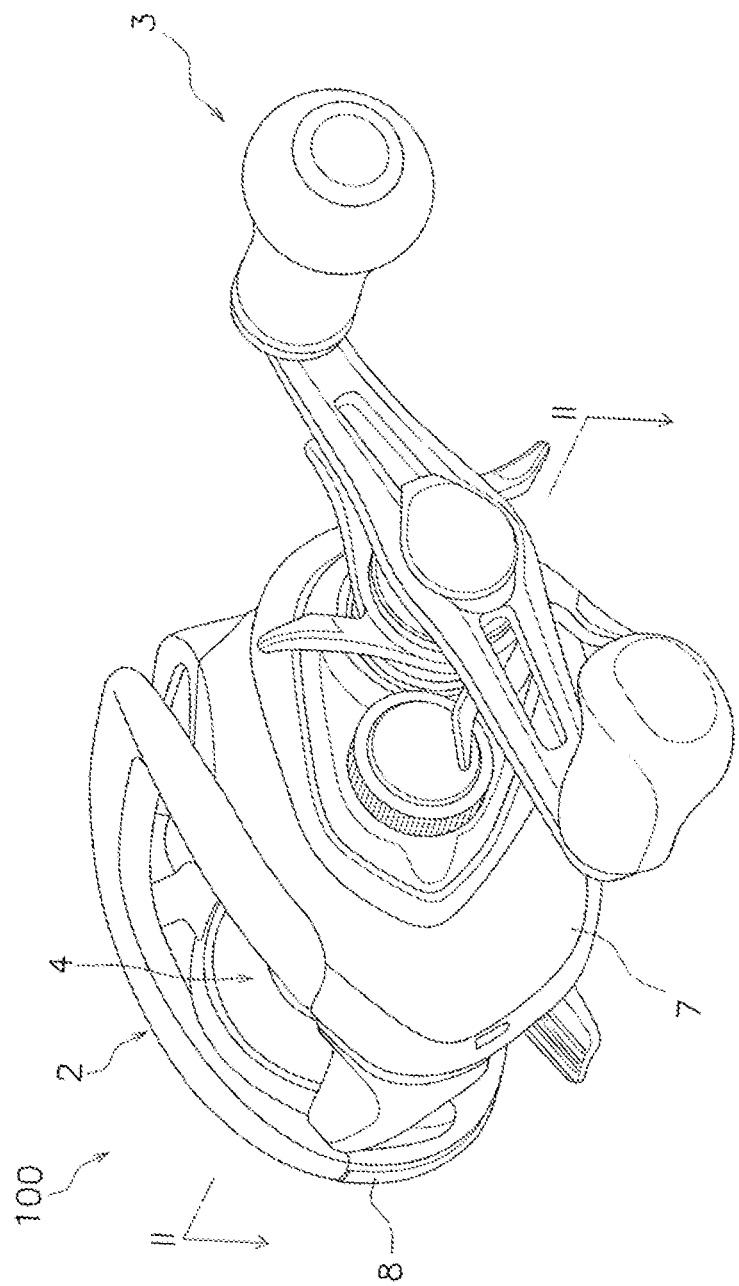
FIG. 1 is a perspective view of a dual-bearing reel.
Figure 2:
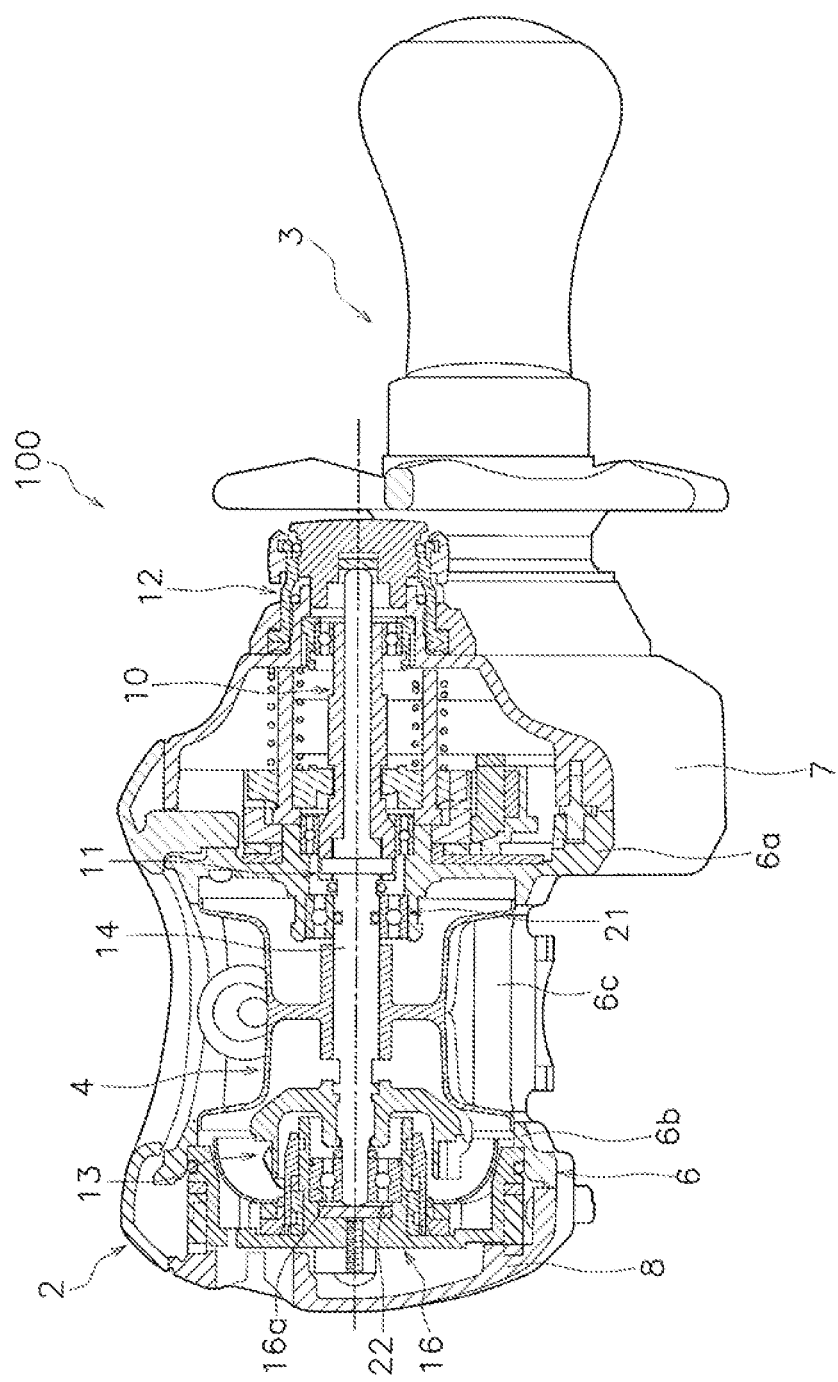
FIG. 2 is a cross-sectional view taken along line II-II of FIG. 1.

FIG. 1 is a perspective view of a dual-bearing reel 100 (an example of a fishing reel) according to an embodiment of the present invention. FIG. 2 is a cross-sectional view taken along line II-II of FIG. 1. The dual-bearing reel 100 is configured to feed a fishing line forward. The dual-bearing reel 100 includes a reel body 2, a handle 3, and a spool 4.

The dual-bearing reel 100 also includes a rotation transmission mechanism 10 configured to transmit rotation of the handle 3 to the spool 4, a clutch mechanism 11, a casting control mechanism 12, a spool braking mechanism 13, and a drag mechanism (not shown).

In the following description, the direction of feeding the fishing line during fishing is referred to as "front," and the opposite direction as "rear." Also, the term "left and right" refers to the left-hand side and the right-hand side of the dual-bearing reel 100 viewed from behind. The direction in which a spool shaft 14 (see FIG. 2) extends is referred to as "axial direction," the direction perpendicular to the spool shaft 14 as "radial direction," and the direction around the spool shaft 14 as "circumferential direction."

The reel body 2 has a frame 6, a right-side cover 7 covering the right side of the frame 6, and a left-side cover 8 covering the left side of the frame 6. The frame 6 includes a first side plate 6a, a second side plate 6b, and a plurality of connecting portions 6c. The second side plate 6b is disposed apart from the first side plate 6a in the axial direction. The plurality of connecting portions 6c connect the first side plate 6a and the second side plate 6b.

The handle 3 is rotatably mounted on a side of the reel body 2. In the present embodiment, the handle 3 is mounted on the right side of the reel body 2.

The spool 4 is made of, for example, an aluminum alloy, and is supported rotatably on the reel body 2 between the first side plate 6a and the second side plate 6b. Specifically, the spool 4 is fixed to the spool shaft 14 supported rotatably on the reel body 2, and is supported rotatably on the reel body 2 via the spool shaft 14.

The spool shaft 14 is an example of the shaft member. The spool shaft 14 is rotatably supported on the reel body 2 via rolling bearings 21, 22 (simply referred to as "bearings 21, 22," hereinafter) that are disposed on the reel body 2. More specifically, the bearings 21, 22 are deep groove ball bearings. The bearing 21 is disposed on the first side plate 6a. The bearing 22 is disposed inside a brake case 16 in which the spool braking mechanism 13 is housed. Specifically, the bearing 22 is disposed in a bearing mounting portion 16a located in the brake case 16.

Figure 3:
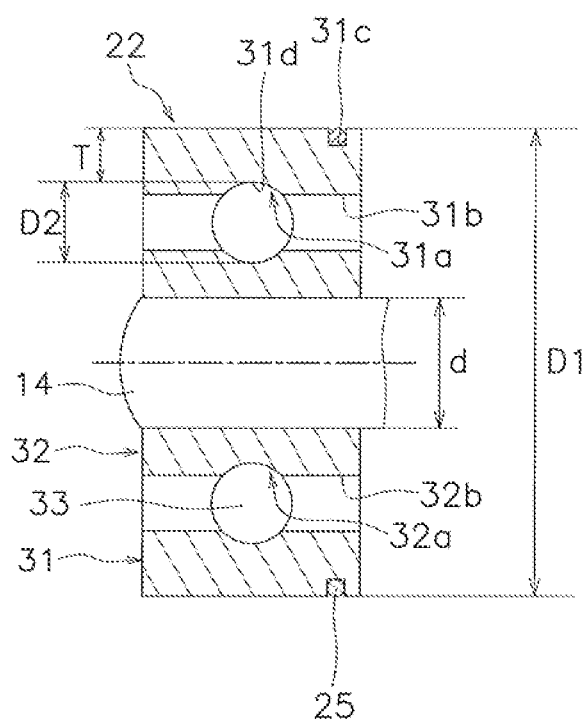
FIG. 3 is a partially enlarged view of FIG. 2.

As shown in FIG. 3, the bearing 22 has an outer diameter D1 that is set at 8 mm or less. The bearing 22 in the present embodiment has the outer diameter D1 of 8 mm, an inner diameter d of 3 mm, and a width of 3 mm.

The bearing 22 has an outer ring 31, an inner ring 32, and a plurality of rolling elements 33.

The outer ring 31 is fixed to the bearing mounting portion 16a by press-fitting. The outer ring 31 has an outer diameter that is set at 8 mm or less. The outer diameter of the outer ring 31 is substantially the same as the outer diameter D1 of the bearing 22. Thus, the outer diameter of the outer ring 31 in the present embodiment is 8 mm.

The outer ring 31 has, on an inner peripheral surface thereof, a drive groove 31a and a pair of shoulder portions 31b. The drive groove 31a is located in the vicinity of the center of the outer ring 31 in the left-right direction. The drive groove 31a is recessed from radially inside to radially outside. The drive groove 31a is formed into a curved shape in which the diameter thereof increases as the distance from the pair of shoulder portions 31b increases. The shoulder portions 31b are arranged on the left and right sides of the drive groove 31a, respectively. The diameter of the pair of shoulder portions 31b is smaller than that of the drive groove 31a. The pair of shoulder portions 31b extends parallel to the axial direction in a cross-sectional view.

The outer ring 31 has a holding groove 31c on an outer peripheral surface thereof. The holding groove 31c is formed over the entire length in the circumferential direction. The holding groove 31c is recessed from radially outside to radially inside. The holding groove 31c is located in a position that does not overlap with the rolling elements 33 in the radial direction. The holding groove 31c is located in a position that overlaps with the pair of shoulder portions 31b in the radial direction.

The outer ring 31 has a thickness that is greater than that of the inner ring 32, except for the part of the outer ring 31 where the holding groove 31c is formed. Note that the thickness of the outer ring 31 can be approximately the same as that of the inner ring 32, and that the thickness of the part where the holding groove 31c is formed can be equal to or greater than that of the inner ring 32.

The outer ring 31 has a minimum thickness T that is set to be 10% or more of the outer diameter D1. Thus, in a case where the outer diameter D1 is 8 mm, the minimum thickness T is set at 0.8 mm or greater. As shown in FIG. 3, the minimum thickness T indicates the smallest thickness in the part that overlaps with the drive groove 31a in the radial direction. In other words, the minimum thickness T according to the present embodiment indicates the distance from a groove bottom 31d having the largest diameter in the drive groove 31a to the outer peripheral surface of the outer ring 31.

It is preferred that the minimum thickness T be 20% or less of the outer diameter D1. Thus, in a case where the outer diameter D1 is 8 mm, the minimum thickness T is preferably 1.6 mm or less. The minimum thickness T in the present embodiment is approximately 0.9 mm.

The inner ring 32 is connected to the spool shaft 14 so as to be integrally rotatable. The inner ring 32 has an inner diameter that is substantially the same as the inner diameter d of the bearing 22. Thus, the inner diameter of the inner ring 32 according to the present embodiment is 3 mm.

The inner ring 32 has, on an outer peripheral surface thereof, a drive groove 32a and a pair of shoulder portions 32b. The drive groove 32a is located in the vicinity of the center of the inner ring 32 in the left-right direction. The drive groove 32a is recessed from radially outside to radially inside. The drive groove 32a is formed into a curved shape in which the diameter thereof decreases as the distance from the pair of shoulder portions 32b increases. The drive groove 32a is disposed so as to face the drive groove 31a in the radial direction. The shoulder portions 32b are arranged on the left and right sides of the drive groove 32a, respectively. The diameter of the pair of shoulder portions 32b is greater than that of the drive groove 32a. The pair of shoulder portions 32b is disposed so as to face the pair of shoulder portions 31b in the radial direction.

The rolling elements 33 are arranged between the outer ring 31 and the inner ring 32. The rolling elements 33 are rotatably held between the outer ring 31 and the inner ring 32 by a holder, not shown. The rolling elements 33 roll in the drive grooves 31a, 32a. The rolling elements 33 are each in a spherical shape, and a diameter D2 of each rolling element 33 in the present embodiment is approximately 1.19 mm. It is preferred that the minimum thickness T be 70% or more of the diameter D2 of the rolling elements 33. Thus, in a case where the diameter D2 of the rolling elements 33 is 1.19 mm, the minimum thickness T is preferably 0.83 mm or greater.

An annular elastic element 25 is disposed between an outer peripheral surface of the bearing 22 and an inner peripheral surface of the bearing mounting portion 16a. The elastic element 25 is made of an elastically deformable member such as rubber. The elastic element 25 according to the present embodiment is an O-ring. The elastic element 25 is held in the holding groove 31c. The inner diameter of the elastic element 25 is smaller than the outer diameter of a bottom of the holding groove 31c. The elastic element 25 is disposed in contact with the inner peripheral surface of the bearing mounting portion 16a. The elastic element 25 is disposed to be pressed inward in the radial direction by the inner peripheral surface of the bearing mounting portion 16a. In a state where the elastic element 25 is not in contact with the inner peripheral surface of the bearing mounting portion 16a, the elastic element 25 protrudes, for example, approximately 0.05 mm from the outer peripheral surface of the outer ring 31. The elastic element 25 absorbs the vibration caused by the rotation of the spool shaft 14.

In the dual-bearing reel 100 with the foregoing configuration, since the minimum thickness T of the outer ring 31 of the bearing 22 having the outer diameter D1 of 8 mm is 10% or more of the outer diameter D1, the thickness of the outer ring 31 required to form the holding groove 31c therein can be secured while reducing a decrease in load bearing capacity of the bearing 22. Accordingly, the elastic element 25, which is held in the holding groove 31c, is able to absorb the vibration caused by the rotation of the spool shaft 14.

In a case where the minimum thickness T is 20% or less of the outer diameter D1, an excessive increase in weight of the bearing itself can be prevented. In a case where the minimum thickness T is 70% or more of the diameter D2 of the rolling elements 33, a decrease in load bearing capacity of the bearing 22 can be reduced more effectively.

Other Embodiments

An embodiment of the present invention and modifications thereof have been described above; however, the present invention is not limited thereto. Various changes can be made to the present invention without departing from the gist of the present invention. In particular, the embodiment and plurality of modifications described in the present specification can be arbitrarily combined as needed.

The bearing 22 has the holding groove 31c in the foregoing embodiment. The same configuration as the bearing 22 can be applied to the bearing 21 as well. The present invention can also be applied to other rolling bearings for the reel body 2. For example, the present invention can be applied to a rolling bearing that rotatably supports a handle shaft or a pinion gear. The present invention can also be applied to other fishing reels such as a spinning reel.

The outer diameter D1 of the bearing 22, the inner diameter d of the bearing 22, the width of the bearing 22, the minimum thickness T, and the diameter D2 of the rolling elements 33 are not limited to the values described in the foregoing embodiment. In accordance with the present invention, at least a configuration in which the outer diameter D1 of the bearing 22 is 8 mm or less and the minimum thickness T is 10% or more of the outer diameter D1 is required. Further, the minimum thickness T can be equal to or greater than the diameter D2 of the rolling elements 33. The diameter D2 of the rolling elements 33 can be made smaller than that described in the foregoing embodiment, and the minimum thickness T can be made greater than that described in the foregoing embodiment. As to the dimensions of the bearing 22 having the outer diameter D1 of 8 mm, the inner diameter d of 3 mm, and the width of 2.5, the diameter D2 of the rolling elements 33 can be set at approximately 0.79 mm and the minimum thickness T can be set at approximately 1.1 mm. In this case, it is possible to reduce the frictional resistance to the rotation even more, and also secure a sufficient thickness for the outer ring 31. Thus, the holding groove 31c in the outer ring 31 can be formed in the outer ring 31 easily. In such a case, the minimum thickness T is 13% or more of the outer diameter D1 and 130% or more of the diameter D2 of the rolling elements 33.

In addition, the weight of the bearing itself can be reduced by setting the outer diameter D1 of the bearing 22 of the foregoing embodiment at 7 mm. In this case, the minimum thickness T is 0.85 mm, which is 12% or more of the outer diameter D1 and 107% or more of the diameter D2 of the rolling elements 33.

REFERENCE SIGNS LIST

2 Reel body
14 Spool shaft (example of shaft member)
22 Rolling bearing
25 Elastic element
31 Outer ring
31c Holding groove
32 Inner ring
33 Rolling element
100 Dual-bearing reel (example of fishing reel)
D1 Outer diameter
D2 Diameter
T Minimum thickness

What is claimed is:

1. A fishing reel, comprising:
a reel body;
a shaft member rotatable with respect to the reel body;
a rolling bearing that includes an outer ring having a holding groove in an outer peripheral surface thereof, an inner ring connected to the shaft member so as to be integrally rotatable, and a rolling element disposed between the outer ring and the inner ring, the rolling bearing having an outer diameter of 8 mm or less to support the shaft member; and
an annular elastic element held in the holding groove, wherein
the holding groove is located in a position that does not overlap with the rolling element in a radial direction of the shaft member, and
the outer ring has a minimum thickness that is 10% or more of the outer diameter of the rolling bearing.

2. The fishing reel according to claim 1, wherein the minimum thickness of the outer ring is 20% or less of the outer diameter of the rolling bearing.

3. The fishing reel according to claim 1, wherein the minimum thickness of the outer ring is 70% or more of a diameter of the rolling element.

4. The fishing reel according to claim 3, wherein the minimum thickness of the outer ring is equal to or greater than the diameter of the rolling element.

5. The fishing reel according to claim 3, wherein the minimum thickness of the outer ring is 130% or more of the diameter of the rolling element.

6. A rolling bearing for a fishing reel, comprising:
an inner ring; and
an outer ring having an inner peripheral surface including a drive groove and a pair of shoulder portions and an outer peripheral surface including a holding groove positioned to overlap with one of the pair of shoulder portions,
the rolling bearing having an outer diameter of 8 mm or less,
a minimum thickness of the outer ring being 10% or more of the outer diameter of the rolling bearing.

7. The rolling bearing of claim 6, wherein the inner ring includes an outer peripheral surface having a drive groove disposed so as to face the drive groove of the outer ring.

8. The rolling bearing of claim 6, wherein the inner ring includes an inner diameter configured to accommodate a shaft.

9. The rolling bearing of claim 6, wherein the outer ring has a thickness equal to or greater than a thickness of the inner ring.

10. The rolling bearing of claim 6, further comprising an annular elastic element held in the holding groove.

11. The rolling bearing of claim 6, further comprising a rolling element disposed between the outer ring and the inner ring,
a minimum thickness of the outer ring is 70% or more of a diameter of the rolling element.

* * * * *